(12) United States Patent
Schneider et al.

(10) Patent No.: US 12,724,564 B2
(45) Date of Patent: Sep. 1, 2026

(54) MEMORY SYSTEM USING DIFFERENT CODING TYPES IN DIFFERENT DRIVE TYPES

(71) Applicant: Huawei Technologies Co., Ltd., Shenzhen (CN)

(72) Inventors: Zvi Schneider, Hod Hasharon (IL); Dor Shmoish, Hod Hasharon (IL); Assaf Natanzon, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

(21) Appl. No.: 18/494,426

(22) Filed: Oct. 25, 2023

(65) Prior Publication Data

US 2024/0053920 A1 Feb. 15, 2024

Related U.S. Application Data

(63) Continuation of application No. PCT/EP2021/060791, filed on Apr. 26, 2021.

(51) Int. Cl.
*G06F 3/06* (2006.01)

(52) U.S. Cl.
CPC .......... *G06F 3/0658* (2013.01); *G06F 3/0619* (2013.01); *G06F 3/064* (2013.01); *G06F 3/0679* (2013.01)

(58) Field of Classification Search
CPC ...... G06F 3/0658; G06F 3/0619; G06F 3/064; G06F 3/0679; G06F 11/1076
See application file for complete search history.

(56) References Cited

U.S. PATENT DOCUMENTS 10,430,279 B1 * 10/2019 Dittia .................... G06F 3/0656
2014/0281689 A1 * 9/2014 Fischer ............... G06F 11/1092 714/6.22
2015/0301896 A1 * 10/2015 Aliev .................. H03M 13/611 714/6.24
2018/0011764 A1 * 1/2018 Akutsu ................. G06F 3/0619
2018/0165208 A1 * 6/2018 Farey .................. G06F 12/0868
2021/0200633 A1 * 7/2021 Liang .................. G06F 12/1009
2023/0350751 A1 * 11/2023 Sapuntzakis ........... G06F 3/067

* cited by examiner

*Primary Examiner* — Rocio Del Mar Perez-Velez
*Assistant Examiner* — Jonah C Krieger
(74) *Attorney, Agent, or Firm* — Conley Rose, P.C.

(57) ABSTRACT

A memory controller stores data comprising a plurality of data blocks in a first memory tier by data striping data on data drives of a first drive type. The memory controller determines a first parity for at least one data stripe of a plurality of data stripes, stores the first parity in one of data drives of the first drive type, determines a plurality of second parities for the at least one data stripe of the plurality of data stripes, and stores the second parities in a second memory tier.

20 Claims, 10 Drawing Sheets

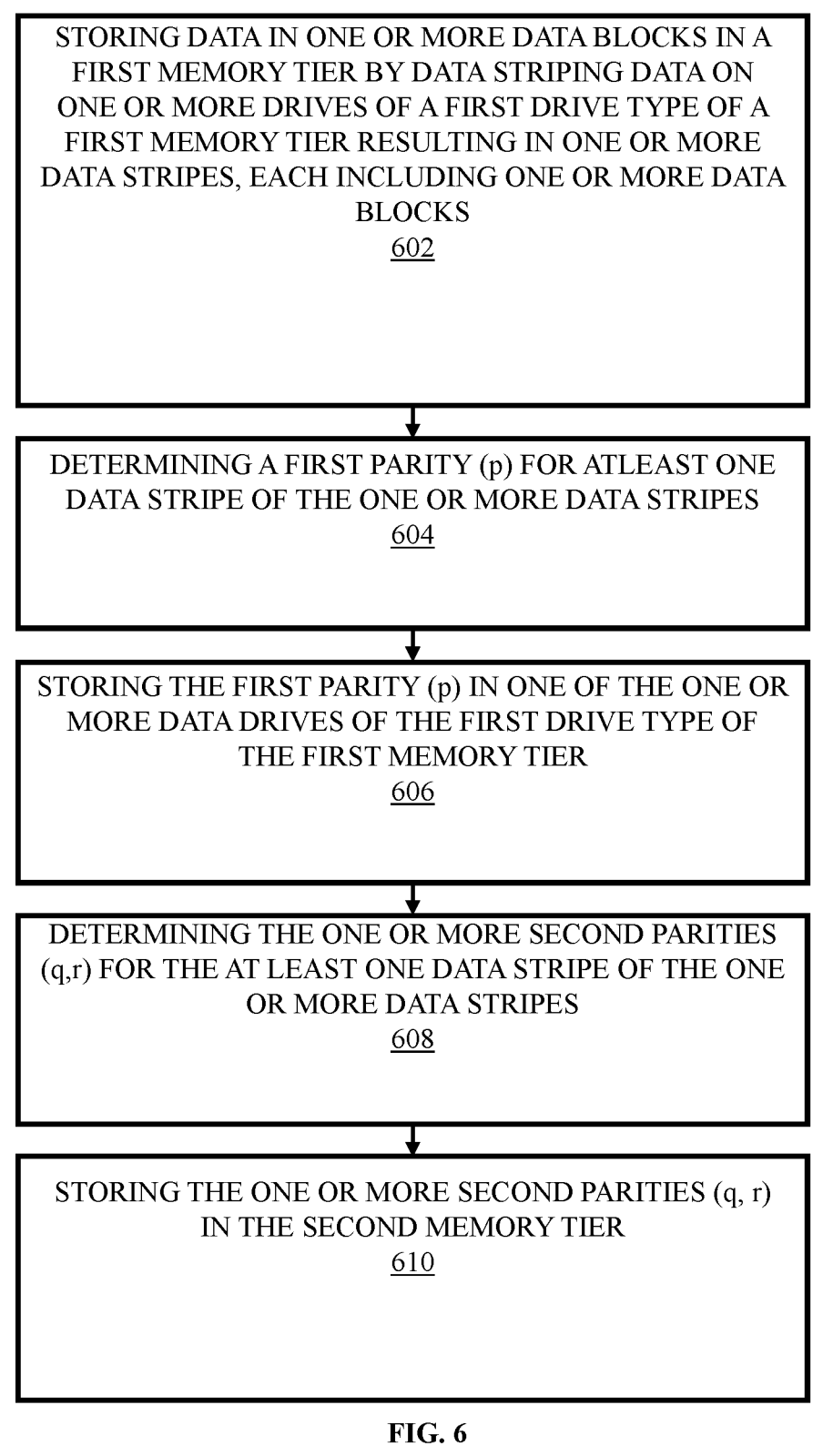

STORING DATA IN ONE OR MORE DATA BLOCKS IN A FIRST MEMORY TIER BY DATA STRIPING DATA ON ONE OR MORE DRIVES OF A FIRST DRIVE TYPE OF A FIRST MEMORY TIER RESULTING IN ONE OR MORE DATA STRIPES, EACH INCLUDING ONE OR MORE DATA BLOCKS
602

DETERMINING A FIRST PARITY (p) FOR ATLEAST ONE DATA STRIPE OF THE ONE OR MORE DATA STRIPES
604

STORING THE FIRST PARITY (p) IN ONE OF THE ONE OR MORE DATA DRIVES OF THE FIRST DRIVE TYPE OF THE FIRST MEMORY TIER
606

DETERMINING THE ONE OR MORE SECOND PARITIES (q,r) FOR THE AT LEAST ONE DATA STRIPE OF THE ONE OR MORE DATA STRIPES
608

STORING THE ONE OR MORE SECOND PARITIES (q, r) IN THE SECOND MEMORY TIER
610

FIG. 6

MEMORY SYSTEM USING DIFFERENT CODING TYPES IN DIFFERENT DRIVE TYPES

CROSS-REFERENCE TO RELATED APPLICATIONS

This is a continuation of International Patent Application No. PCT/EP2021/060791 filed on Apr. 26, 2021, which is hereby incorporated by reference in its entirety.

TECHNICAL FIELD

The disclosure relates generally to non-volatile memory systems, and more particularly, the disclosure relates to a memory system and a method for use in the memory system.

BACKGROUND

In-memory systems, for example, solid-state drives (SSDs), hard disk drives (HDDs), or storage class memory (SCM) media, are primarily used to bridge the gap between memory and NAND media. The SCM gives the ability to deploy servers with very high storage capacities and at a lower cost than using the traditional dynamic random-access memory (DRAM) alone. The data saved on the SCM tier is usually higher priority data and therefore the service in terms of latency and quality of service is very critical.

However, the use of SCM as high priority data tier possess potential challenges such as reliability due to drive failures. When the SCM performance is closer to DRAM, SCM drives can fail and therefore may necessitate at least two parities protection. Further, SCM drives are expensive and only a few drives can be deployed when SCM is used as a capacity tier, as the additional number of parities directly increases the cost. Moreover, the use of SCM drives necessitates stretching the data stripe across all the SCM drives to get reasonable efficiency. This in turn loses the ability to have a low-write-cost rebuild scheme, especially when a strip of a stripe is to be replaced with a strip on the SCM drive that was not previously included in the stripe.

In existing methods, erasure codes are created using a single media, for example, redundant array of independent disk (RAID) 5 on HDDs. These methods which use single media are usually more expensive since all the data is stored on a higher tier device, which is generally costly. Other methods also discuss creating erasure codes on different types of media, i.e. over two types of devices. However, there is no recommendation in the existing methods on leveraging erasure codes on several types of devices without compromising the performance characteristics of the higher tier devices in case of drive failures.

Therefore, there arises a need to address the aforementioned technical drawbacks in existing storage systems or storage systems leveraging SCM technology.

SUMMARY

It is an object of the disclosure to provide a memory system including a memory controller and a method for use in the memory system while avoiding one or more disadvantages of other approaches.

This object is achieved by the features of the independent claims. Further implementation forms are apparent from the dependent claims, the description, and the figures. The disclosure provides a memory system and a method for use in the memory system for improving performance of SCM storage systems.

According to a first aspect, there is provided a memory system including a memory controller. The memory system is configured to be operatively connected to a first memory tier and to a second memory tier. The first memory tier includes one or more data drives of a first drive type and the second memory tier includes one or more data drives of a second drive type. The memory controller is configured to store data including a plurality of data blocks in the first memory tier by data striping the data on the one or more data drives of the first drive type of the first memory tier resulting in a plurality of data stripes, each including one or more data blocks. The memory controller is further configured to determine a first parity (p) for at least one data stripe of the plurality of data stripe. The memory controller is further configured to store the first parity (p) in one of the one or more data drives of the first drive type of the first memory tier. The memory controller is further configured to determine a plurality of second parities (q, r) for the at least one data stripe of the plurality of data stripes. The memory controller is further configured to store the plurality of second parities (q, r) in the second memory tier.

The memory system uses regenerative erasure codes for protecting the data saved in the first memory tier. The parities of the regenerative codes are placed at two different memory tiers as a single parity is placed on the first memory tier and the second and third parties are placed in the second memory tier. Accordingly, there is only one single parity overhead in the first memory tier, thereby increasing usable capacity in the first memory tier which in turn save significant cost as the first memory tier is very expensive. This in turn improves the performance of the first memory tier. Additionally, the parity codes placed in the second memory tier provides for rebuilding the failed device drivers at a relatively higher speed. The second memory tier has higher bandwidth performance.

Optionally, the memory controller is configured to receive a memory request indicating a data stripe, read the data stripe and the first parity (p) from the first memory tier, determine that one block in the data stripe is faulty and in response thereto reconstruct the faulty block based on the first parity (p). Optionally, the data stripe and the first parity are read in parallel, as the memory controller accesses the first parity (p) and reconstructs the faulty block based on the first parity (p) in parallel, it results in a low latency. Further, reconstruction of the faulty block includes a bandwidth oriented workflow, where the memory controller may read parities from the second tier and uses a regenerative reconstruction flow to efficiently reconstruct the failed drive using less data blocks.

Optionally, the memory controller is further configured to determine that at least one drive of the first memory tier has failed, read data stripes from the first memory tier, read the second parities from the second memory tier and rebuild the data blocks of the at least one failed drive based on the second parities and the read data stripes. Optionally, the second parities are read in parallel. When performing a data block rebuild due to a first memory tier drive failure, parities stored in the second memory tier are read in parallel, and this will provide for optimal throughput.

Optionally, the memory controller is further configured to determine that at least one block in the first memory tier is faulty, determine a load on the memory system, and determine whether to regenerate the faulty block(s) or to rebuild the faulty data block(s) based on the load of the memory system. Optionally, the memory controller is further configured to determine that the size of the memory request is above a size threshold and in response thereto rebuild the faulty data block(s).

Optionally, the memory controller is configured to determine that the indicated data stripe is on a data drive having a priority falling under a priority threshold and in response thereto rebuild the faulty data block(s). Optionally, the memory controller is configured to determine a load of the first memory tier, determine that the load of the first memory tier exceeds a load threshold, and in response thereto rebuild the faulty data block(s).

Optionally, the memory controller is configured to determine a load of the second memory tier, determine that the load of the second memory tier exceeds a load threshold, and in response thereto regenerate the faulty block based on the first parity (p).

Optionally, the memory controller is further configured to determine a load and latency of the first memory tier, determine a load and latency of the second memory tier, determine the size of a memory command, determine a first time to complete the memory command by reading from the first memory tier, determine a second time to complete the memory command by reading from the first memory tier and from the second memory tier and read from the first memory tier if the first time is lower than the second time or read from the first memory tier and the second memory tier if the second time is lower than the first time.

Optionally, the memory controller is configured to store the plurality of second parities (q, r) in the second memory tier by data striping the plurality of second parities.

Optionally, the memory controller is configured to store the data in the second memory tier by data striping the data.

Optionally, the memory controller is configured to determine a local parity for the second memory tier and to store the local parity in the second memory tier.

Optionally, the memory controller is configured to determine the first parity for one data stripe through coding based on a XOR operation for that data stripe.

Optionally, the memory controller is configured to determine the second parities for one data stripe through coding based on that data stripe and at least one other data stripe. The coding for determining the second parities may be regenerative. The coding for determining the second parities (q, r) may be maximum distance separable (MDS).

Optionally, the first drive type has a faster access time than the second drive type. Optionally, the first drive type is SCM and the second drive type is NAND.

According to a second aspect, there is provided a method for use in a memory system including a memory controller, the memory system being connected to a first memory tier and to a second memory tier, the first memory tier including one or more data drives of a first drive type and the second memory tier comprising one or more data drives of a second drive type. The method includes storing data comprising a plurality of data blocks in the first memory tier by data striping the data on the one or more data drives of the first drive type of the first memory tier resulting in a plurality of data stripes, each comprising one or more data blocks. The method further includes determining a first parity (p) for at least one data stripe of the plurality of data stripes. The method further includes storing the first parity (p) in one of the one or more data drives of the first drive type of the first memory tier. The method further includes determining a plurality of second parities (q, r) for the at least one data stripe of the plurality of data stripes. The method further includes storing the plurality of second parities (q, r) in the second memory tier.

By spreading the placement of the parities in the secondary memory tier, during a drive failure of the first memory tier, the parities placed in the second memory tier can be read in parallel, while performing a data rebuild.

According to a third aspect, there is provided a computer-readable media comprising instructions that when loaded into and executed by a memory controller enables the memory controller to execute the method according to a second aspect of the disclosure.

A technical problem in other approaches is resolved, where the technical problem is how to preserve performance characteristics of higher tier memory devices without incurring additional cost and latency during data drive failures.

Therefore, in contradistinction to other approaches, according to the memory systems and the method for use in the memory systems provided in the disclosure, leverage erasure codes or regenerative codes to allow improved recovery from a drive failure without incurring any additional cost for having multiple parities. The regenerative codes provide capabilities to reduce the input/output operations required to recover the failed drives either by rebuild or degraded read functionalities. Rebuild includes a bandwidth oriented workflow while degraded read includes a latency oriented workflow. Thus for degraded read of a single data block, the codes are read-only from the first memory tier and perform a simple XOR repair to get an optimal latency for degraded input/output. Further, the rebuild uses a regenerative flow, where the regenerative codes are also read from the secondary memory tier to efficiently reconstruct the failed drive using less data blocks.

The regeneration scheme for data blocks in case of a data loss due to drive failure is achieved by placing a single simple parity on the first memory tier and placing multiple parities the second memory tier. Further regenerative codes are used to allow improved data recovery from a drive failure without incurring additional cost of having multiple parities.

These and other aspects of the disclosure will be apparent from and the implementation(s) described below.

BRIEF DESCRIPTION OF DRAWINGS

Implementations of the disclosure will now be described, by way of example only, with reference to the following diagrams in which:

FIG. 6 is a flow diagram of a method for use in a memory system including a memory controller in accordance with an implementation of the disclosure.

DETAILED DESCRIPTION OF THE DRAWINGS

Implementations of the disclosure provide a memory system having a microcontroller and a method for use in the memory system for creating erasure codes over multi tires of data storage for recovery of data during device drive failures and achieve the same performance and availability while reducing the cost.

To make the solutions of the disclosure more comprehensible for a person skilled in the art, the following implementations of the disclosure are described with reference to the accompanying drawings.

Terms such as "a first", "a second", "a third", and "a fourth" (if any) in the summary, claims, and foregoing accompanying drawings of the disclosure are used to distinguish between similar objects and are not necessarily used to describe a specific sequence or order. It should be understood that the terms so used are interchangeable under appropriate circumstances, so that the Implementations of the disclosure described herein are, for example, capable of being implemented in sequences other than the sequences illustrated or described herein. Furthermore, the terms "include" and "have" and any variations thereof, are intended to cover a non-exclusive inclusion. For example, a process, a method, a system, a product, or a device that includes a series of steps or units, is not necessarily limited to expressly listed steps or units, but may include other steps or units that are not expressly listed or that are inherent to such process, method, product, or device.

Figure 1:
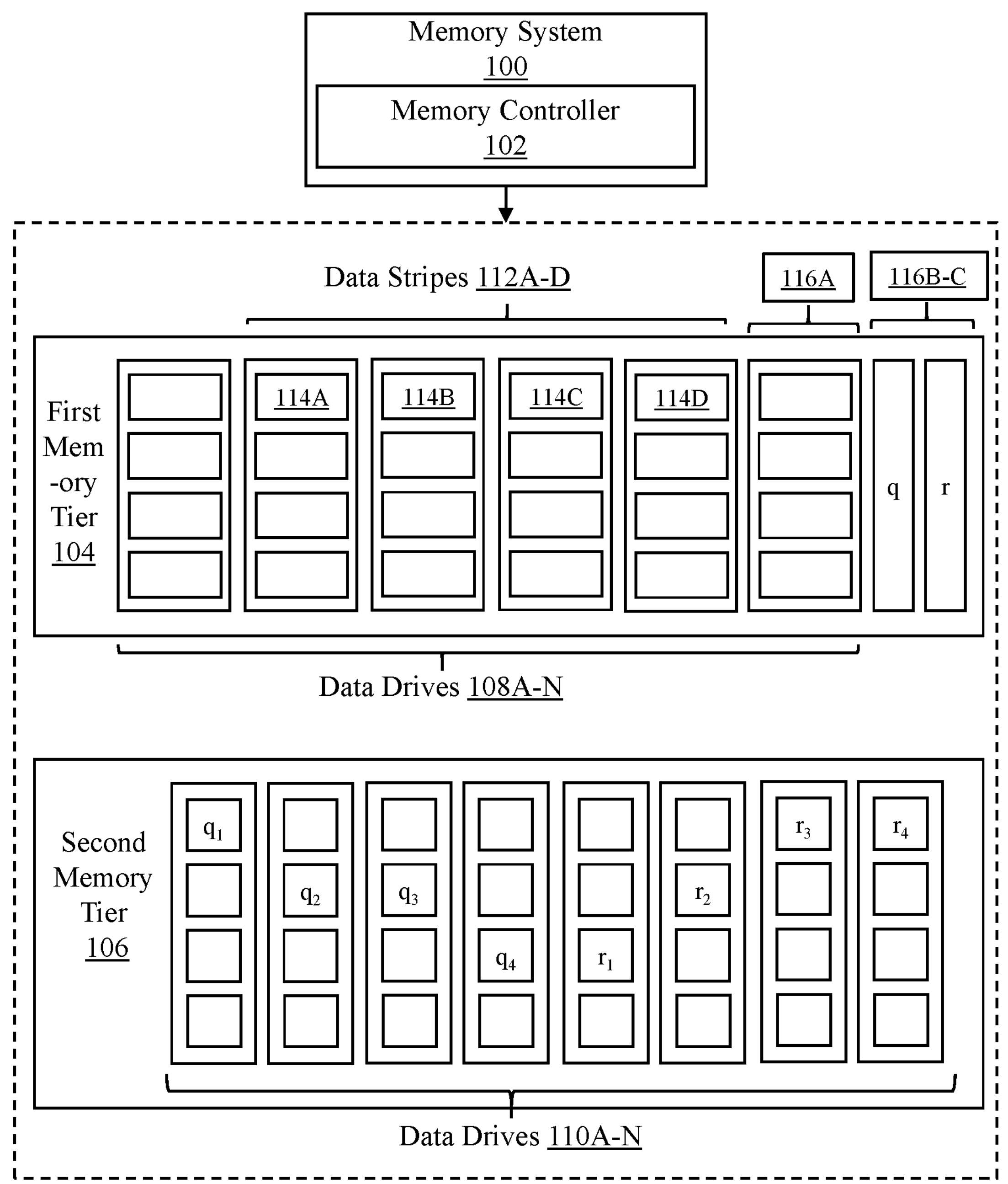
FIG. 1 is a block diagram depicting a memory system in accordance with an implementation of the disclosure.

FIG. 1 is a block diagram that illustrates a memory system 100 in accordance with an implementation of the disclosure. The memory system 100 includes a memory controller 102. The memory system 100 is configured to be operatively connected to a first memory tier 104 and a second memory tier 106. The first memory tier 104 includes one or more data drives 108A-N of a first drive type. The second memory tier 106 includes one or more data drives 110A-N of a second drive type. The memory controller 102 is configured to store data including one or more data blocks 114A-D in the first memory tier 104 by data striping the data on the one or more data drives 108A-N of the first drive type of the first memory tier 104 resulting in one or more data stripes 112A-D, each including the one or more data blocks 114A-D. The memory controller 102 is further configured to determine a first parity (p) 116A for at least one data stripe of the one or more data stripes 112A-D and store the first parity (p) 116A in one of the one or more data drives 108A-N of the first drive type of the first memory tier 104. The memory controller 102 is further configured to determine one or more second parities (q, r) 116B-C for the at least one data stripe of the one or more data stripes 112A-D and store the one or more second parities (q, r) 116B-C in the second memory tier 106.

Data striping is used to transparently distribute data over multiple data blocks to make the block appear as a single fast, large data block. Data striping is useful when a processing device requests data more quickly than a single storage device can provide it. By spreading segments across multiple devices that can be accessed concurrently, total data throughput is increased. Data striping improves aggregate input/output (I/O) performance by allowing multiple I/Os to be serviced in parallel.

The memory controller 102 optionally receives a memory request indicating a data stripe. The memory controller 102 may read the data stripe and the first parity (p) 116A from the first memory tier 104. The memory controller 102 may determine that one block in the data stripe is faulty due to drive failure or data loss. The memory controller 102 may reconstruct the faulty block based on the first parity (p) 116A. The data stripe and the first parity (p) 116A are read in parallel.

Optionally, the memory controller 102 is further configured to (i) determine that at least one drive of the first memory tier 104 has failed, (ii) read the one or more data stripes 112A-D from the first memory tier 104, (iii) read the one or more second parities (q, r) 116B-C from the second memory tier 106, and (iv) rebuild the data blocks 114A-D of the at least one failed drive based on the one or more second parities (q, r) 116B-C and the read one or more data stripes 112A-D. The one or more second parities (q, r) 116B-C may be read in parallel.

Optionally, the memory controller 102 is further configured to (i) determine that at least one block in the first memory tier 104 is faulty, (ii) determine a load on the memory system 100, and (iii) determine whether to regenerate the faulty block(s) or to rebuild the faulty data block(s) based on the load of the memory system 100.

Optionally, the memory controller 102 is further configured to determine that the size of the memory request is above a size threshold and in response thereto rebuild the faulty data block(s). Optionally, the memory controller 102 is further configured to determine that the indicated data stripe is on a data drive having a priority falling under a priority threshold and in response thereto rebuild the faulty data block(s). Optionally, the memory controller 102 is further configured to (i) determine a load of the first memory tier 104, and (ii) determine that the load of the first memory tier 104 exceeds a load threshold and in response thereto rebuild the faulty data block(s).

Optionally, the memory controller 102 is further configured to (i) determine a load of the second memory tier 106, and (ii) determine that the load of the second memory tier 106 exceeds a load threshold and in response thereto regenerate the faulty block based on the first parity (p) 116A. Optionally, the memory controller 102 is further configured to (i) determine a load and latency of the first memory tier 104, (ii) determine a load and latency of the second memory tier 106, (iii) determine the size of a memory command, (iv) determine a first time to complete the memory command by reading from the first memory tier 104, (v) determine a second time to complete the memory command by reading from the first memory tier 104 and from the second memory tier 106; and (vi) read from the first memory tier 104 if the first time is lower than the second time; or read from the first memory tier 104 and the second memory tier 106 if the second time is lower than the first time.

The memory controller 102 may be further configured to store the one or more second parities (q, r) 116B-C in the second memory tier 106 by data striping the one or more second parities (q, r) 116B-C. The memory controller 102 may be further configured to store the data in the second memory tier 106 by data striping the data. The memory controller 102 may be further configured to determine a local parity for the second memory tier 106 and to store the local parity in the second memory tier 106.

The memory controller 102 may be further configured to determine the first parity (p) 116A for one data stripe through coding based on a XOR operation for that data stripe. The memory controller 102 may be further configured to determine the one or more second parities (q, r) 116B-C for one data stripe is determined through coding based on that data stripe and at least one other data stripe. The coding for determining the one or more second parities (q, r) 116B-C may be regenerative. The coding for determining one or more the second parities (q, r) 116B-C is MDS. Optionally, the first drive type has a faster access time than the second drive type. The first drive type may be SCM and the second drive type may be NAND.

Figure 2:
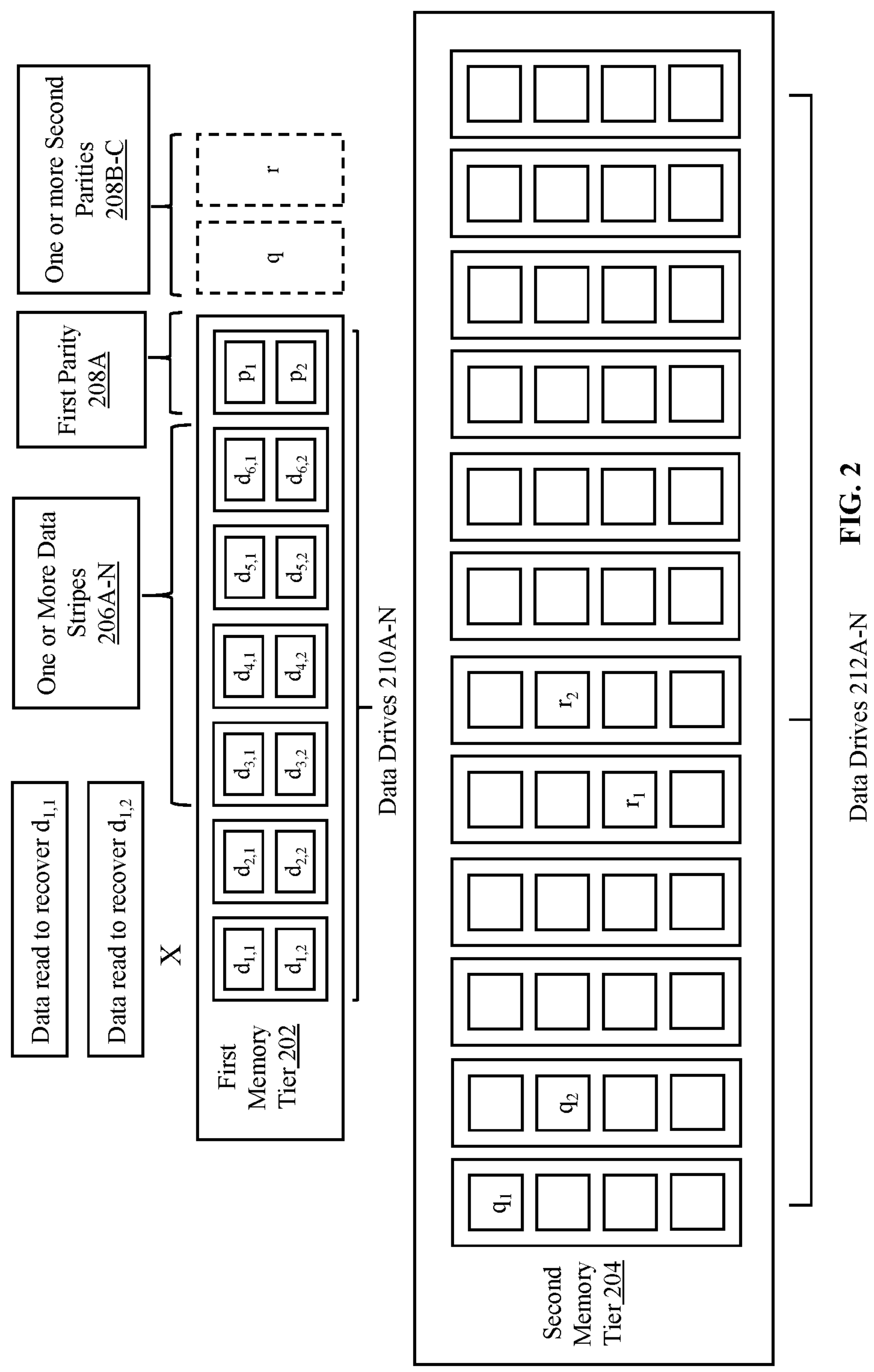
FIG. 2 is an exemplary block diagram that illustrates data recovery during drive failure in a memory system in accordance with an implementation of the disclosure.

FIG. 2 is an exemplary block diagram that illustrates data recovery during drive failure in a memory system in accordance with an implementation of the disclosure. The exemplary block diagram includes the memory system, a first memory tier 202, a second memory tier 204, one or more data stripes 206A-N, a first parity (p) 208A, one or more second parities (q, r) 208B-C, one or more data drives 210A-N of the first memory tier 202 and one or more data drives 212A-N of the second memory tier 204. The memory system uses regenerative codes to allow improved recovery from a drive failure without paying cost of having multiple parities. For example, instead of having, for instance, 6+2 in the first memory tier 202, a 6+1+2 format is used, where 1 parity is placed on the first memory tier 202 and the additional 2 parities are on the second memory tier 204.

According to the example herein, consider a code with 6 data nodes, 1 simple+2 additional parities (3 total) defined by:

$$p_1=d_{1,1}+d_{2,1}+d_{3,1}+d_{4,1}+d_{5,1}+d_{6,1}$$

$$p_2=d_{1,2}+d_{2,2},+d_{3,2}+d_{4,2}+d_{5,2}+d_{6,2}$$

$$q_1=d_{1,1}+d_{2,1}+2d_{3,1}+3d_{4,1}+4d_{5,1}+5d_{6,1}+d_{1,2}$$

$$q_2=d_{1,2}+d_{2,2}+2d_{3,2}+3d_{4,2}+4d_{5,2}+5d_{6,2}+d_{2,1}+d_{3,1}$$

$$r_1=d_{1,1}+2d_{2,1}+3d_{3,1}+4d_{4,1}+4d_{5,1}+6d_{6,1}+d_{4,2}$$

$$r_2=d_{1,2}+2d_{2,2}+3d_{3,2}+4d_{4,2}+4d_{5,2}+6d_{6,2}+d_{5,1}+2d_{6,1}$$

In case of failure of the drive $d_1$, two data strips $d_{1,1}$, and $d_{1,2}$ have to be regenerated. The RS code, needs to read 12 data strips, $d_{2,1}$, $d_{3,1}$, $d_{4,1}$, $d_{5,1}$, $d_{6,1}$, $p_1$ and $d_{2,2}$, $d_{3,2}$, $d_{4,2}$, $d_{5,2}$, $d_{6,2}$, $p_2$, for regeneration of the missing one or more data stripes 206A-N.

The regenerative code reconstruction according to this implementation is performed using the following equation:

$$d_{1,1}=d_{2,1}+d_{3,1}+d_{4,1}+d_{5,1}+d_{6,1}+p_1$$

$$d_{1,2}=d_{1,1}+d_{2,1}+2d_{3,1}+3d_{4,1}+4d_{5,1}+5d_{6,1}+q_1$$

The implementation requires to read only 7 elements; $d_{2,1}$, $d_{3,1}$, $d_{4,1}$, $d_{5,1}$, $d_{6,1}$, $p_1$, $q_1$, where 6 data stripes are already present in the first memory tier 202. Here, the first parity (p) 208A for one data stripe is determined through coding based on a XOR operation for that data stripe. A memory controller is further configured to determine the one or more second parities (q, r) 208B-C for one data stripe through coding based on that data stripe 206 and at least one other data stripe. Here the coding for determining the one or more second parities (q, r) 208B-C is regenerative and/or MDS.

Figure 3:
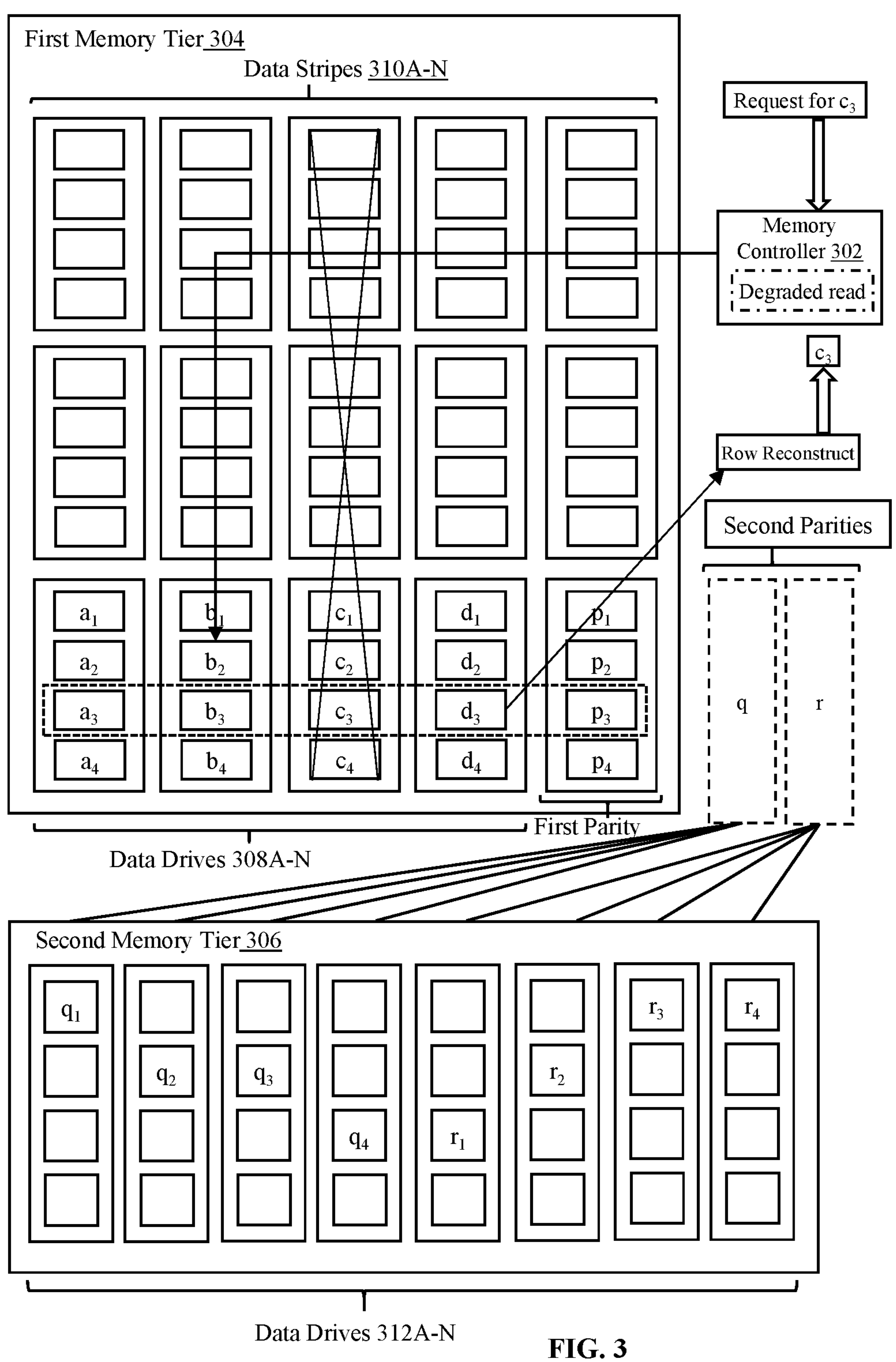
FIG. 3 is an exemplary block diagram that illustrates degraded read of a single block in accordance with an implementation of the disclosure.

FIG. 3 is an exemplary block diagram that illustrates degraded read of a single block in accordance with an implementation of the disclosure. The exemplary block diagram includes a memory controller 302, a first memory tier 304, a second memory tier 306, one or more data drives 308A-N of the first memory tier 304, one or more data drives 312A-N of the second memory tier 306, and one or more data stripes 310A-N. Reconstruction of the one or more data stripes 310A-N is performed depending on the requirement to achieve an optimal service level on rebuild from the first memory tier 304. The memory controller 302 receives a memory request indicating a missing data stripe. As shown in FIG. 3, the data stripe requested is C3. The memory controller 302 reads the data stripe C3 and determines that one data block d4 in the one or more data stripes 310A-N is faulty or non-existent due to data loss or drive failure. The memory controller 302 then reads the data blocks in its row and a first parity (p) from the first memory tier 304. Further, based on a first parity (p), the memory controller 302 reconstructs the faulty block, C3, and recover the missing data.

Thus, for the degraded read of a single block, the memory controller 302 has to read the data block only from the first memory tier 304 and then do a simple XOR row reconstruct. This is the minimal possible read latency to recover a data block d4. Further, a number of operations are minimal, the one or more data stripes 310A-N and the first parity (p), are read in parallel, and therefore first memory tier 304 latency is the lowest.

Figure 4:
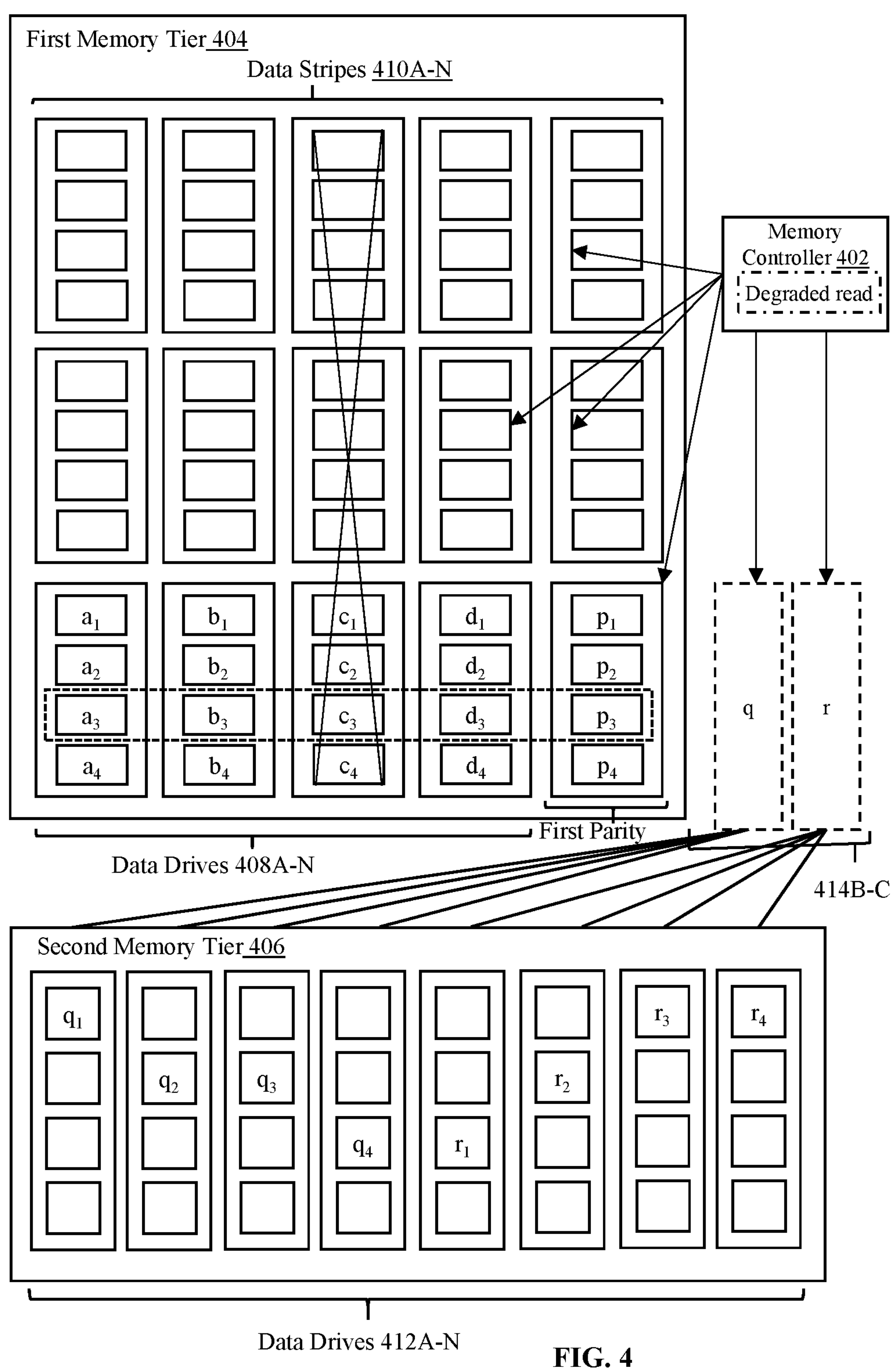
FIG. 4 is an exemplary block diagram that illustrates rebuilding of data blocks in accordance with an implementation of the disclosure.

FIG. 4 is an exemplary block diagram that illustrates rebuilding of data blocks in accordance with an implementation of the disclosure. The exemplary block diagram includes a memory controller 402, a first memory tier 404, a second memory tier 406, one or more data drives 408A-N of the first memory tier 404, one or more data stripes 410A-N, one or more data drives 412A-N of the second memory tier 406 and one or more second parities (q, r) 414B-C. The memory controller 402 determines that at least one drive 408 of the first memory tier 404 has failed, as a result of an error signal or when performing a memory access operation. Here regenerative codes are used to improve recovery from a drive failure without paying the cost of having multiple parities. Thus, when performing a drive rebuild upon the first memory tier 404 drive failure, the memory controller 402 reads the one or more data stripes 410A-N from the first memory tier 404 and also reads the one or more second parities (q, r) 414B-C from the second memory tier 406 to perform regenerative construct of the missing data. Further, the memory controller 402 rebuilds the data blocks of the rebuild the data blocks of the failed drive based on the one or more second parities (q, r) 414B-C and the read one or more data stripes 410A-N. The memory controller 402 reads the one or more second parities (q, r) 414B-C in parallel. The regenerative codes according to FIG. 4 are reconstructed for 6+1+2 in cost lower than 6+2, and with only 7% additional cost with respect to 6+1, and rebuild speed is almost 2 times faster. Additionally, the drive rebuild can be performed with smaller stripes, and hence there is no need to stretch the parity over all one or more data drives 408A-N of the first memory tier 404. This in turn allows a faster rebuild of the missing data drive.

Figure 5:
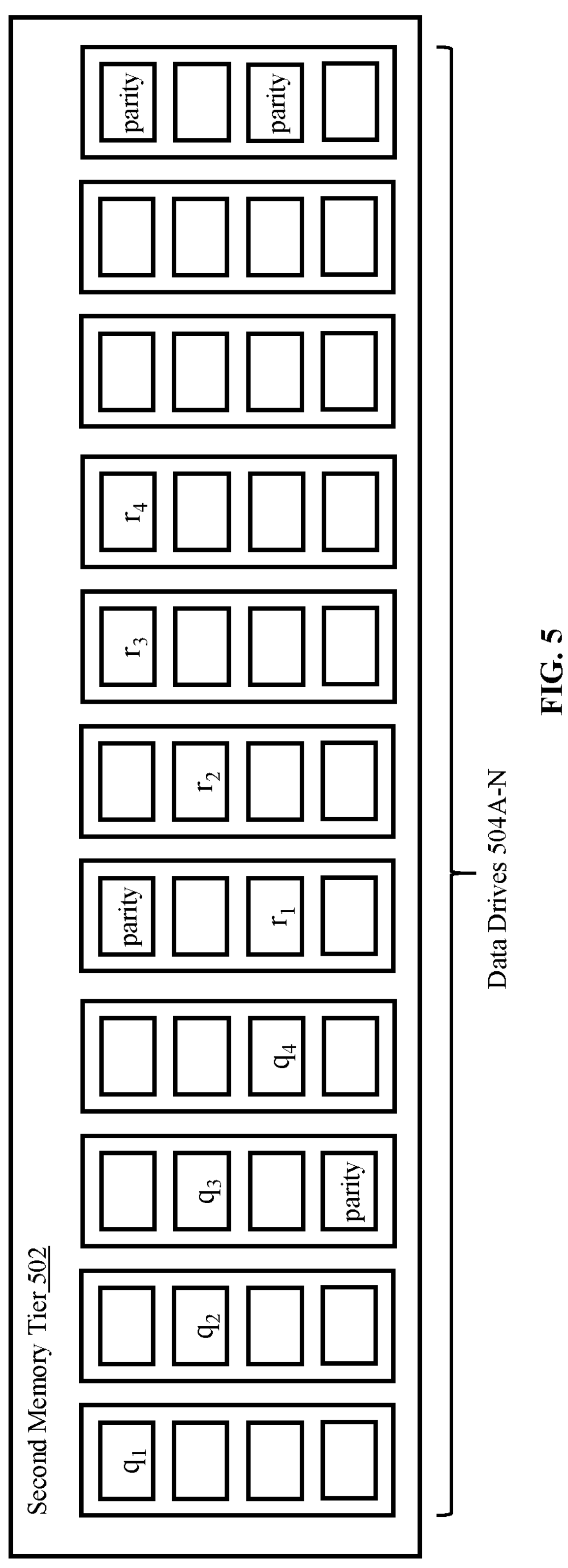
FIG. 5 is a block diagram of tired parities for practicing in accordance with an implementation of the disclosure.

FIG. 5 is a block diagram of tired parities for practicing in accordance with an implementation of the disclosure. As illustrated in FIG. 5, one or more second parities (q, r), are placed in one or more data drives 504A-N of a second memory tier 502. A memory controller that is configured to store the one or more second parities (q, r), in the second memory tier 502 by data striping the one or more second parities (q, r). The memory controller is further configured to store the data in the second memory tier 502 by data striping the data. The secondary memory tier 502 is generally of less cost than a first memory tier, and thus two or more parities can be provided at a lower cost. Further, the parities are placed on the second memory tier 502 based on a number of drives on the second memory tier 502 and the performance characteristics of the second memory tier 502. The parities are placed such that the throughput is high when reading the one or more second parities (q, r), and also the one or more second parities (q, r) can be read in parallel. Furthermore, the parities are placed on the second memory tier 502 taking into consideration the case of a drive failure of the secondary memory tier 502. The memory controller determines a local parity for the second memory tier 502 and stores the local parity in the second memory tier 502. The placing of the one or more second parities (q, r), locally provides for easy recovery of missing data in case of a drive failure of the secondary memory tier 502.

When placing the extended parities in the second memory tier 502, the number of drives in that memory tier can also be leveraged. The second memory tier 502 is an independent failure domain and the parities data are broken into blocks and spread them over the second memory tier 502 in even distribution. The exact layout on the second memory tier 502 may be tuned depending on the first memory tier used. The block size is to be selected so as to optimize the read bandwidth from the first memory tier, while considering write flow constraints to the second memory tier 502. This way, upon recovery, the recovered drives are bounded by drive input-output operations.

FIG. 6 is a flow diagram of a method for use in a memory system including a memory controller in accordance with an implementation of the disclosure. The memory system being connected to a first memory tier and to a second memory tier, the first memory tier including one or more data drives of a first drive type, and the second memory tier including one or more data drives of a second drive type. At a step 602, data is stored in one or more data blocks in the first memory tier by data striping the data on the one or more data drives of the first drive type of the first memory tier resulting in one or more data stripes, each including the one or more data blocks. At a step 604, a first parity (p) for at least one data stripe of the one or more data stripes is determined. At a step 606, the first parity (p) is stored in one of the one or more data drives of the first drive type of the first memory tier. At a step 608, one or more second parities (q, r) for the at least one data stripe of the one or more data stripes are determined. At a step 610, the one or more second parities (q, r) are stored in the second memory tier. The method for use in a memory system including a memory controller to store regenerative codes and additional parities in the second memory tier to improve data drive rebuild speed in case of a data loss or drive failure.

Figure 7:
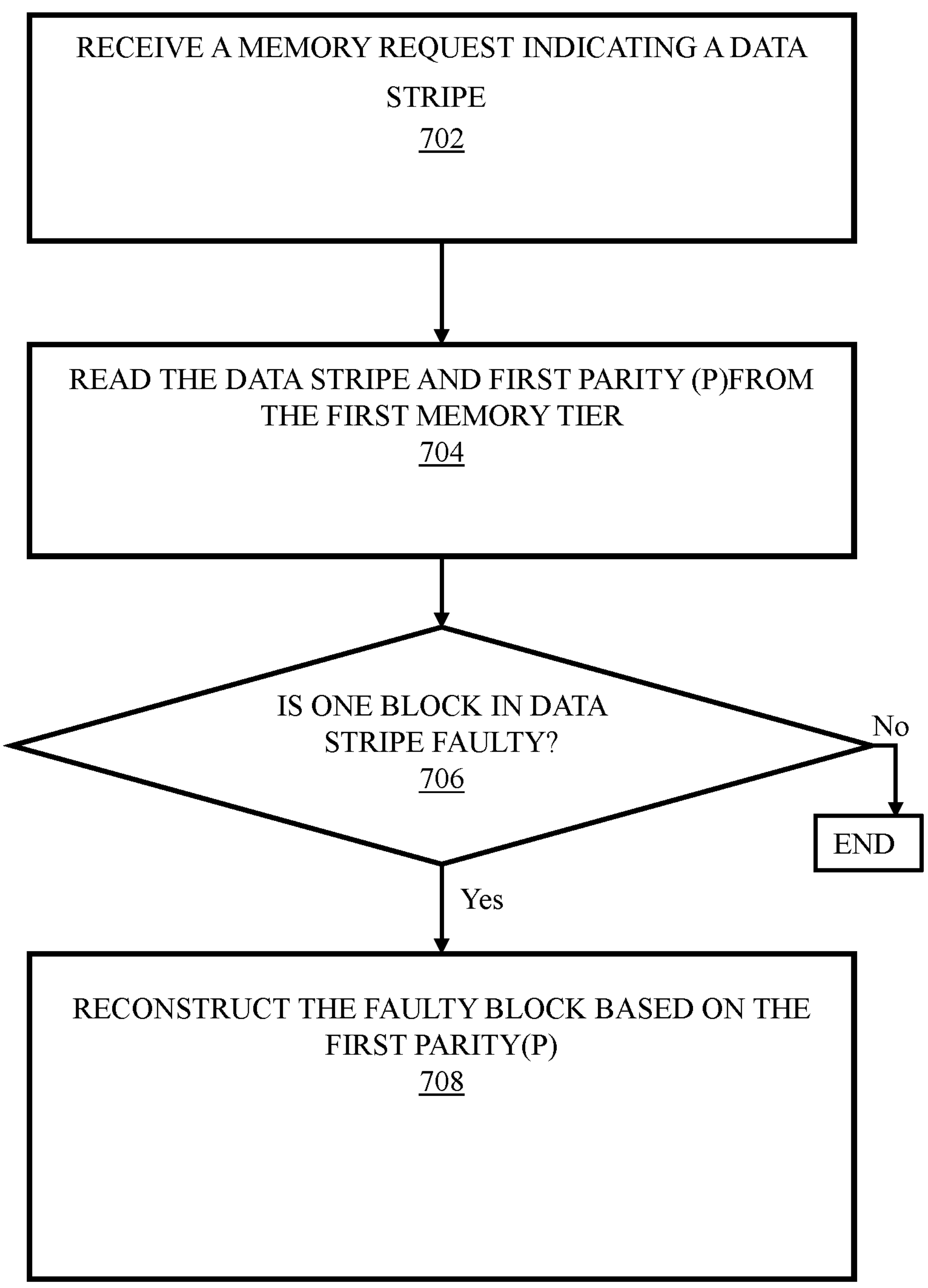
FIG. 7 is a flow diagram of a method of regenerating faulty blocks in accordance with an implementation of the disclosure.

FIG. 7 is a flow diagram of a method of regenerating faulty blocks in accordance with an implementation of the disclosure. At a step 702, a memory request indicating a data stripe is received by a memory controller. At a step 704, the data stripe and the first parity (p) are read from the first memory tier by the memory controller. At a step 706, it is determined that one block in the data stripe is faulty by the memory controller. At a step 708, the faulty block is reconstructed based on the first parity by the memory controller, if the at least one block in the requested data stripe is a faulty block. Else terminate the process. The data stripe and the first parity (p) are read in parallel, thereby reducing the latency.

Figure 8:
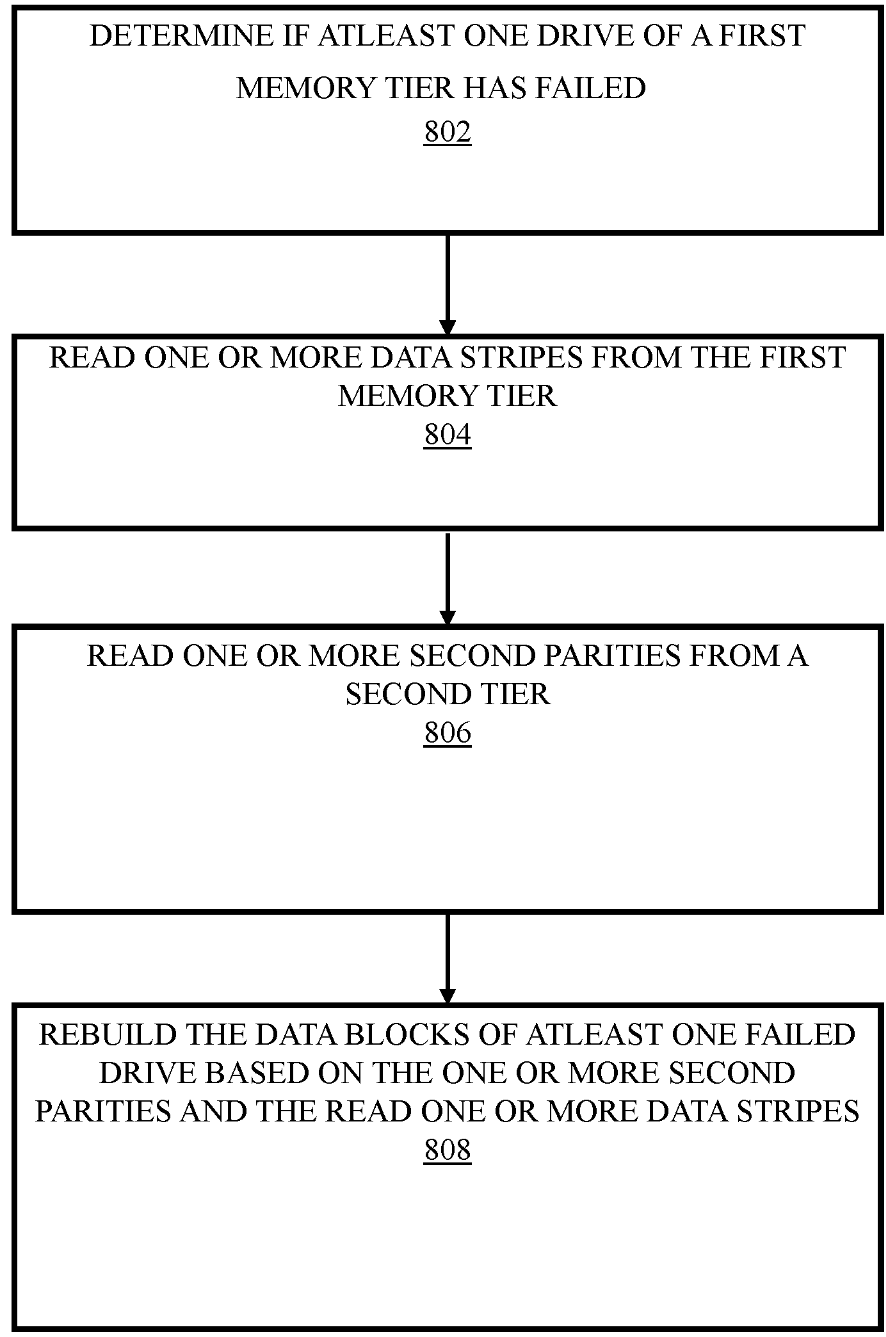
FIG. 8 is a flow diagram of a method of rebuilding faulty blocks in accordance with another implementation of the disclosure.

FIG. 8 is a flow diagram of a method of rebuilding faulty blocks in accordance with another implementation of the disclosure. At a step 802, it is determined that at least one data drive of a first memory tier has failed by a memory controller. In case of a data drive failure, at a step 804, read the one or more data stripes which are relevant from the first memory tier. At a step 806, the one or more second parities are read from a second memory tier by the memory controller. At a step 808, data blocks of the at least one failed drive are rebuilt based on the one or more second parities and the read one or more data stripes by the memory controller. Here, the one or more second parities placed in the second memory tier are read in parallel. As the parities data is spread over the drives, reading them in parallel with provide optimum bandwidth.

Figure 9:
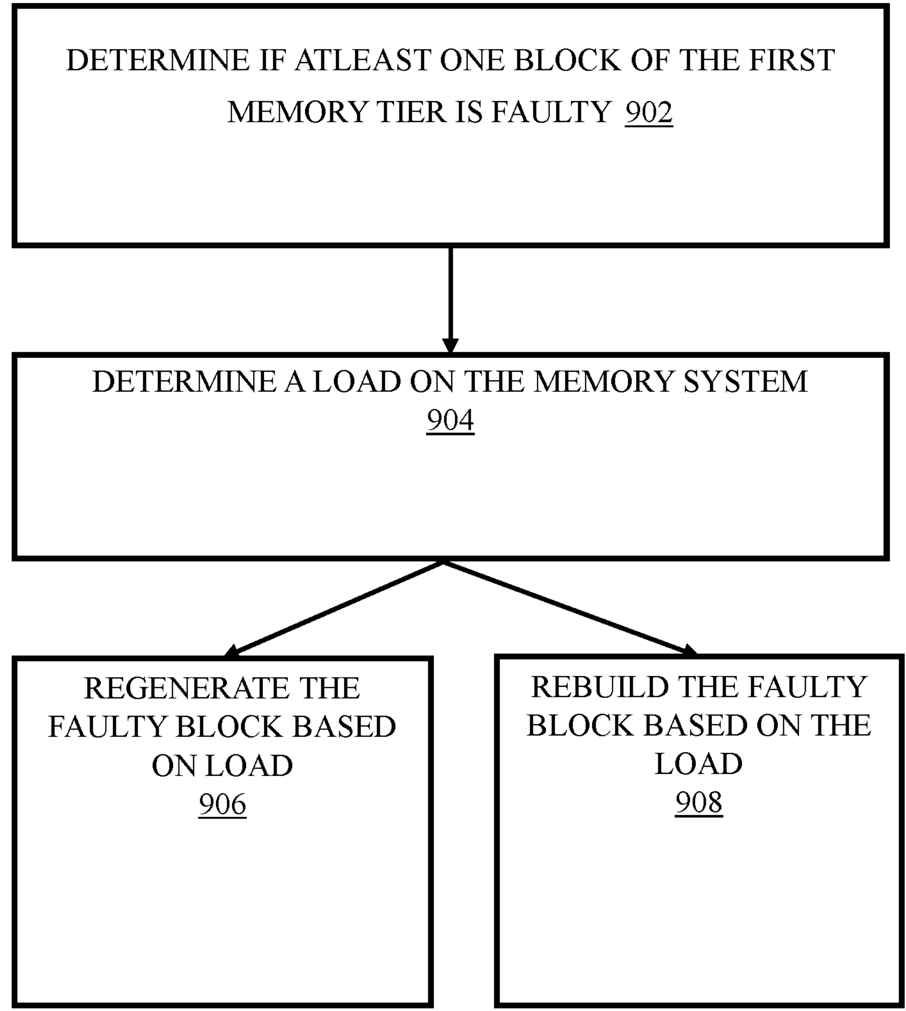
FIG. 9 is a flow diagram illustrating recovery of faulty blocks in accordance with yet another implementation of the disclosure.

FIG. 9 is a flow diagram illustrating recovery of faulty blocks in accordance with yet another implementation of the disclosure. At a step 902, it is determined that at least one block of a first memory tier is faulty by a memory controller. At a step 904, a load on a memory system is determined by the memory controller. It is determined whether to regenerate the faulty block (s) at a step 906, or to rebuild the faulty data block(s) based on the load of the memory system by the memory controller at a step 908.

The memory controller determines to rebuild the faulty data blocks on determining that a size of the memory request is above a size threshold, the indicated data stripe is on a data drive having a priority falling under a priority threshold, and if the load of the first memory tier exceeds a load threshold. Further, the memory controller determines to rebuild the faulty data blocks on determining that the indicated data stripe is on a data drive having a priority falling under a priority threshold. Further, the memory controller determines a load of the first memory tier, and if the load of the first memory tier exceeds a load threshold, in response thereto rebuild the faulty data block(s).

The memory controller then determines a load of a second memory tier and if the load of the second memory tier exceeds a load threshold and in response thereto regenerate the faulty block based on the first parity (p).

Figure 10:
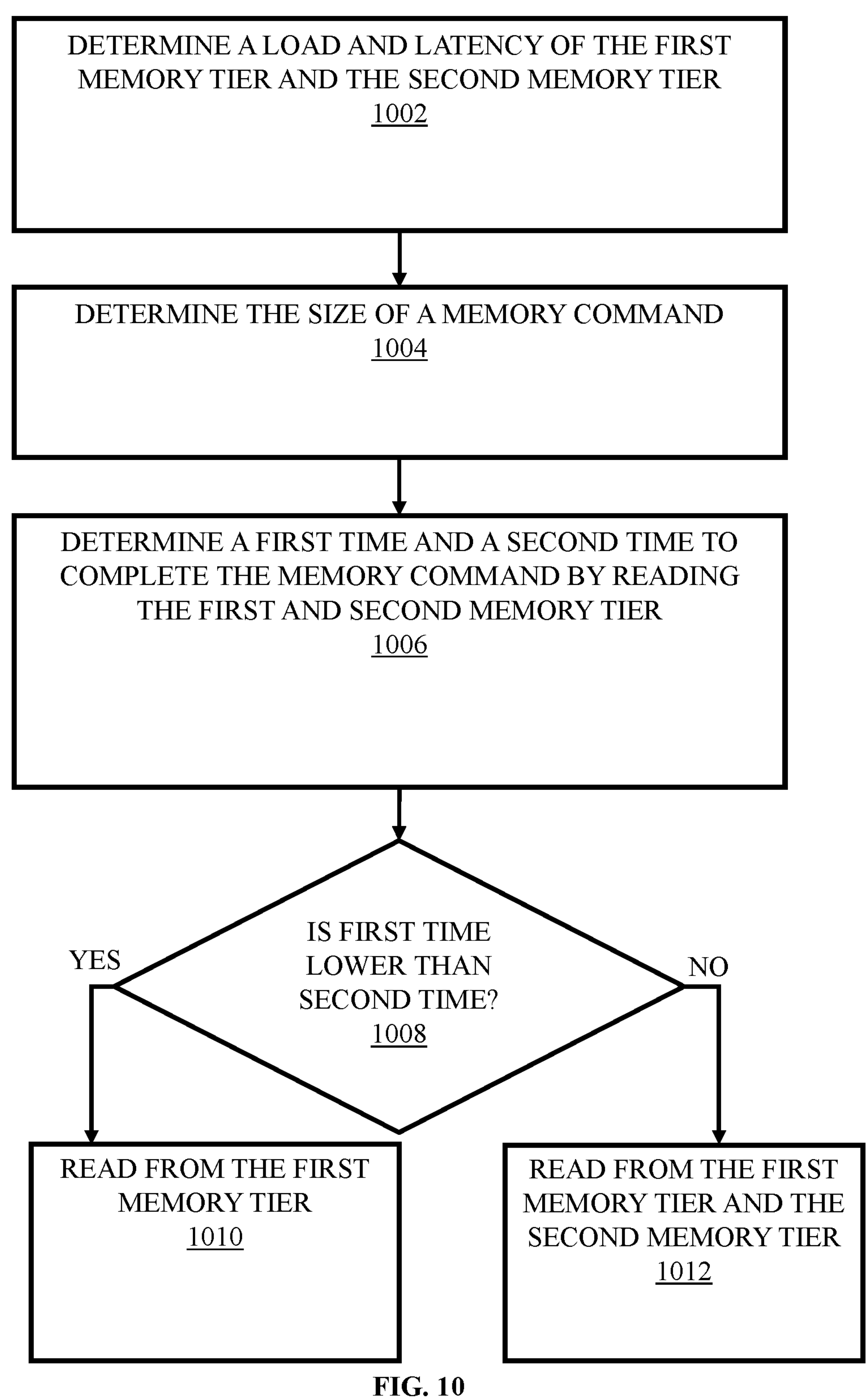
FIG. 10 is a flow diagram illustrating a data read optimization based on a load on the memory system in accordance with yet another implementation of the disclosure.

FIG. 10 is a flow diagram illustrating a read optimization based on load on a memory system in accordance with yet another implementation of the disclosure. Generally, for degraded read, the memory read is always performed from a first memory tier. In this implementation, the data read is optimized based on the load on the memory system. For instance, if the load on the first memory device is high or if the size of the media read or request is very large, and becomes less latency dependent, the memory system determines to do the media read using the second memory tier.

At a step 1002, a load and latency of the first memory tier and the second memory tier are determined respectively. At a step 1004, the size of a memory command, such as a memory read or a request is determined. At a step 1006, a first time to complete the memory command by reading from the first memory tier and a second time to complete the memory command by reading from the first memory tier and from the second memory tier is determined. At a step 1008, it is determined that first time to complete the memory command is lower than a second time to complete the memory command or not. If the first time is lower than the second time, then at a step 1010, the data is read from the first memory tier. If the second time is lower than the first time, then at a step 1012, read the media from the first memory tier and the second memory tier.

The method enables usage of memory systems leveraging SCM at a much more affordable price. Further, it significantly improves Dorado (and FusionStorage) competitiveness for high-performance SCM based workload. This is due to the significant improvement in rebuild speed that yields lower impact on service level that SCM based workloads expect when using SCM tier, thus providing better performance. SCM media can also be implemented at a low cost. With SCM tier, it possible to have 6+1+2(2 on SSD) in cost lower than 6+2, and with only 7% additional cost with respect to 6+1, and almost 2 times the recovery speed. The implementation herein can be extended to a larger number of parities and can be used in other new media types as well.

It should be understood that the arrangement of components illustrated in the figures described are exemplary and that other arrangements may be possible. It should also be understood that the various system components (and means) defined by the claims, described below, and illustrated in the various block diagrams represent components in some systems configured according to the subject matter disclosed herein. For example, one or more of these system components (and means) may be realized, in whole or in part, by at least some of the components illustrated in the arrangements illustrated in the described figures.

In addition, while at least one of these components are implemented at least partially as an electronic hardware component, and therefore constitutes a machine, the other components may be implemented in software that when included in an execution environment constitutes a machine, hardware, or a combination of software and hardware.

Although the disclosure and its advantages have been described in detail, it should be understood that various changes, substitutions and alterations can be made herein without departing from the spirit and scope of the disclosure as defined by the appended claims.

The invention claimed is:

1. An apparatus, comprising:

a memory configured to store instructions; and a memory controller coupled to the memory and configured to execute the instructions to:

store data comprising a plurality of first data blocks in a first memory tier by data striping the data on one or more first data drives of a first drive type of the first memory tier to produce a plurality of first data stripes, wherein each of the plurality of first data stripes comprises one or more of the plurality of first data blocks;

calculate, for at least one second data stripe of the plurality of first data stripes and using a first coding type, a first parity corresponding to the at least one second data stripe, wherein the first coding type comprises an XOR operation;

store, in the one or more first data drives, the first parity;

calculate, for the at least one second data stripe and using a second coding type, a plurality of second parities corresponding to the at least one second data stripe, wherein the second coding type comprises regenerative coding or maximum distance separable (MDS) coding;

store, in a second memory tier, the plurality of second parities, wherein the second memory tier comprises one or more second data drives of a second drive type;

reconstruct, in response to detecting that a second data block in the first memory tier is faulty, the second data block using the first parity stored in the one or more first data drives of the first memory tier; and rebuild, in response to detecting that at least one of the one or more first data drives of the first memory tier has failed, third data blocks of the at least one of the one or more first data drives using the plurality of second parities stored in the one or more second data drives of the second memory tier.

2. The apparatus of claim 1, wherein the memory controller is further configured to execute the instructions to:

receive a memory request indicating a third data stripe, wherein the third data stripe comprises the second data block;

read, from the first memory tier, the third data stripe and the first parity; and detect, based on the third data stripe and the first parity, that the second data block in the third data stripe is faulty.

3. The apparatus of claim 2, wherein the memory controller is further configured to execute the instructions to further read, in parallel, the third data stripe and the first parity.

4. The apparatus of claim 1, wherein the memory controller is further configured to execute the instructions to:

detect that the at least one of the one or more first data drives has failed;

read, from the first memory tier, the plurality of first data stripes; and read, from the second memory tier, the plurality of second parities, and wherein rebuilding the third data blocks further comprises rebuilding, based on the plurality of first data stripes and the plurality of second parities, the third data blocks of the at least of the one or more first data drives.

5. The apparatus of claim 4, wherein the memory controller is further configured to execute the instructions to further read, in parallel, the plurality of second parities.

6. The apparatus of claim 2, wherein the memory controller is further configured to execute the instructions to:

detect that at least one of the first data blocks is faulty;

detect a load on the apparatus; and regenerate the at least one of the first data blocks or rebuild the at least one of the first data blocks based on the load.

7. The apparatus of claim 2, wherein the memory controller is further configured to execute the instructions to:

detect that a size of the memory request is above a size threshold; and rebuild, in response to the size being above the size threshold, the second data block.

8. The apparatus of claim 2, wherein the memory controller is further configured to execute the instructions to:

detect that the third data stripe is on one of the one or more first data drives having a priority less than a priority threshold; and rebuild, in response to the priority being less than the priority threshold, the second data block.

9. The apparatus of claim 2, wherein the memory controller is further configured to execute the instructions to:

detect a load of the first memory tier;

detect that the load exceeds a load threshold; and rebuild, in response to the load exceeding the load threshold, the second data block.

10. The apparatus of claim 2, wherein the memory controller is further configured to execute the instructions to:

detect a load of the second memory tier;

detect that the load exceeds a load threshold; and regenerate, in response to the load exceeding the load threshold, the second data block.

11. The apparatus of claim 1, wherein the memory controller is further configured to execute the instructions to:

detect a first load and a first latency of the first memory tier;

detect a second load and a second latency of the second memory tier;

detect a size of a memory command;

read from the first memory tier when a first time to complete the memory command by reading from the first memory tier is lower than a second time to complete the memory command by reading from the first memory tier and the second memory tier; and read from the first memory tier and the second memory tier when the second time is lower than the first time.

12. The apparatus of claim 1, wherein the memory controller is further configured to execute the instructions to further store, by data striping, the plurality of second parities in the second memory tier.

13. The apparatus of claim 1, wherein the memory controller is further configured to execute the instructions to store, by data striping, the data in the second memory tier.

14. The apparatus of claim 1, wherein the memory controller is further configured to execute the instructions to:

calculate, for the second memory tier, a local parity; and store, in the second memory tier, the local parity.

15. The apparatus of claim 1, wherein the memory controller is further configured to execute the instructions to calculate, through coding based on the at least one second data stripe and at least one other data stripe, the plurality of second parities.

16. A computer program product comprising instructions stored on a non-transitory computer-readable medium that, when executed by one or more processors, cause an apparatus to:

store data comprising a plurality of first data blocks in a first memory tier by data striping the data on one or more first data drives of a first drive type of the first memory tier to produce a plurality of first data stripes, wherein each of the plurality of first data stripes comprises one or more of the plurality of first data blocks;

calculate, for at least one second data stripe of the plurality of first data stripes and using a first coding type, a first parity corresponding to the at least one second data stripe, wherein the first coding type comprises an XOR operation;

store, in the one or more first data drives, the first parity;

calculate, for the at least one second data stripe and using a second coding type, a plurality of second parities corresponding to the at least one second data stripe, wherein the second coding type comprises regenerative coding or maximum distance separable (MDS) coding;

store, in a second memory tier, the plurality of second parities, wherein the second memory tier comprises one or more second data drives of a second drive type;

reconstruct, in response to detecting that a second data block in the first memory tier is faulty, the second data block using the first parity stored in the one or more first data drives of the first memory tier; and rebuild, in response to detecting that at least one of the one or more first data drives of the first memory tier has failed, third data blocks of the at least one of the one or more first data drives using the plurality of second parities stored in the one or more second data drives of the second memory tier.

17. The apparatus of claim 1, wherein the memory controller is further configured to execute the instructions to:

detect that at least one of the first data blocks is faulty;

detect a load of the first memory tier;

detect that the load of the first memory tier exceeds a load threshold; and rebuild, in response to the load of the first memory tier exceeding the load threshold, the at least one of the first data blocks using the plurality of second parities stored in the one or more second data drives of the second memory tier.

18. The apparatus of claim 1, wherein the memory controller is further configured to execute the instructions to:

detect that at least one of the first data blocks is faulty;

detect a load of the second memory tier;

detect that the load of the second memory tier exceeds a load threshold; and reconstruct, in response to the load of the second memory tier exceeding the load threshold, the at least one of the first data blocks using the first parity stored in the one or more first data drives of the first memory tier without accessing the second memory tier.

19. The apparatus of claim 1, wherein the first drive type comprises storage class memory (SCM) or non-volatile RAM, wherein the second drive type comprises flash memory or hard disk drives, and wherein the first memory tier has a faster access time than the second memory tier.

20. The apparatus of claim 1, wherein the memory controller is further configured to execute the instructions to:

store, by data striping, the plurality of second parities across the one or more second data drives of the second memory tier; and calculate, for the second memory tier, a local parity; and store, in the second memory tier, the local parity.

* * * * *